United States Patent [19]

Baker

[11] 4,235,413
[45] Nov. 25, 1980

[54] ELECTRICALLY ACTUATED VALVE

[76] Inventor: William E. Baker, 10627 Sugar Hill, Houston, Tex. 77042

[21] Appl. No.: 913,372

[22] Filed: Jun. 7, 1978

[51] Int. Cl.³ .................. F16K 31/04; F01B 19/04
[52] U.S. Cl. ........................... 251/11; 60/531; 92/48; 236/68 A; 251/61.4; 251/282
[58] Field of Search .......... 236/68 A, 68 R; 251/5, 251/11, 61, 61.2, 61.3, 61.4, 282; 92/48; 60/530, 531

[56] References Cited

U.S. PATENT DOCUMENTS

| | | | |
|---|---|---|---|
| 1,875,387 | 9/1932 | Mackintosh | 236/68 A |
| 2,027,979 | 1/1936 | Hopkins | 92/48 |
| 2,322,762 | 6/1943 | Malone | 60/531 |
| 2,335,761 | 11/1943 | Hultman | 60/530 |
| 2,573,522 | 10/1951 | Watt | 251/61.4 |
| 2,977,050 | 3/1961 | Sparrow | 251/11 |
| 3,212,447 | 10/1965 | Browne | 92/48 |
| 3,760,832 | 9/1973 | McGowen, Jr. et al. | 251/11 |
| 4,079,589 | 3/1978 | Birli | 60/531 |

FOREIGN PATENT DOCUMENTS 1088256  3/1955  France ................. 60/531

*Primary Examiner*—Martin P. Schwadron
*Assistant Examiner*—G. L. Walton
*Attorney, Agent, or Firm*—Howard L. Rose

[57] ABSTRACT

A fast-acting reliable electrically operated normally opened or normally closed valve includes a piston which is spring-biased open and which is actuable by pressurized actuating fluid to drive a plug against a valve seat to terminate working fluid flow. Operating current is passed through stainless steel and copper tubes which are connected in series and contain actuating fluid. The stainless steel tube is heated by the current and vaporizes the actuating fluid-generating pressure which forces the cooler fluid from the copper tube into driving relation with the piston. When current is turned off, the stainless steel tube cools decreasing the vapor pressure. The cooler fluid from the copper tube is forced into the stainless tube by the biasing spring and accelerates condensation in the stainless steel tube to lower the pressure and quickly re-open the valve. A unique seal arrangement includes an elastomeric sleeve disposed about a portion of the piston and secured at its ends to the piston and piston housing, respectively. The piston housing wall is arranged to restrain bulging of the seal at any one location during the piston stroke, thereby preventing rupture of the seal.

20 Claims, 2 Drawing Figures

ELECTRICALLY ACTUATED VALVE

BACKGROUND OF THE INVENTION

The present invention relates to improvements in power-operated valves of the type wherein an actuating fluid is employed to effect valving of a controlled fluid. More particularly, the present invention relates to improvements which render such valves more reliable, faster acting, and operable with less expenditure of energy than prior art valves. In addition the present invention relates to an improved sealing arrangement between a piston and chamber housing whereby a major cause of seal rupture is eliminated.

It is well known in the prior art to employ an actuating fluid to drive a piston-like valving member to control the flow of a working fluid. The actuating fluid may be driven under manual, hydraulic, electrical, or other control means. All prior art valves of this type suffer from one or more of the following disadvantages:

(a) The seal between the actuating and working fluids is subject to rupture. It is common for such seals to take the form of a flexible sleeve disposed about a portion of the piston and secured at opposite ends to the piston and housing. Upon movement of the piston the sleeve seal tends to bulge outwardly from the piston, the bulging usually occurring at the same seal location each time until that location weakens and ruptures. This destruction of the seal results in loss of the actuating fluid in the working fluid flow. To avoid this, many prior art valves employ O-rings or similar sealing members which move as a whole with the piston. These movable sealing members not only undergo film leakage but are subject to a high degree of wear and tear and must be replaced relatively often. The film leakage around O-rings, U-rings, etc., does render the devices inoperative over a period of time.

(b) The actuating fluid must act in opposition to relatively high working fluid pressure in order to drive the piston. Usually the piston terminates in a valving surface which abuts a valve seat in the closed position of the valve and is displaced from the seat to permit working fluid flow. In closing the valve there is usually a relatively high working fluid pressure acting on the valving surface to resist closure. This requires correspondingly high pressures in the actuating fluid, which pressures are achieved only with the expenditure of considerable energy.

(c) Many prior art valves of the type described are electrically operated, using electrical heating to expand the actuating fluid and thereby drive the valving piston. A severe disadvantage of these types of valves has always been the long actuation times. Specifically, the time required from the actuating fluid to expand sufficiently to drive the piston has precluded use of these valves in many applications. Likewise, the recovery time of the cooling actuating liquid is quite long so that a complete cycle of closing and opening the valve is extremely time-consuming. Part of the problem in this area relates to poor transfer of heat from the current carrier to the actuating fluid during actuation and poor transfer of heat away from the heated fluid upon deactuation.

(d) Another problem area in electrically operated valves of the type described relates to the effect of the high temperature actuating fluid on the seal between the working and actuating fluids. More particularly, continuous exposure to high temperature actuating fluid tends to thermally degrade and/or destroy the seal material.

It is therefore a primary object of the present invention to provide an electrically operated valve which is reliable, has a long life, operates quickly, and is actuated by expending minimal energy.

Another object of the present invention to provide a seal for the working fluid of a piston actuating thermal motor which seal is statically sealed at its edges and which is supporting along its length by the piston and when compressed is constrained to compress uniformly along its length.

It is another object of the present invention to provide an electrically operated valve with improved thermal conductivity to and from the actuating fluid to permit faster valve cycling times.

It is also an object of the present invention to provide an actuable valve in which the force from the working fluid pressure acting against the valve actuation is effectively balanced by an equal and opposite force from the working fluid pressure acting with the valve actuation.

It is another object of the present invention to provide an electrically operated valve in which the heated actuating fluid is significantly cooled before contacting the seal between the working and actuating fluids.

It is still another object of the present invention to provide a valve of the fluid-actuated piston type having an improved and reliable sealing arrangement to completely seal the actuating fluid by static seals while allowing the actuating piston to move axially in response to pressure from said actuating fluid.

It is another object of the present invention to provide an electrically operated valve which requires only low actuating fluid pressures and therefore consumes less electrical energy.

It is still another object of the present invention to provide a fluid seal arrangement between a piston and its housing, which sealing arrangement employs a flexible sleeve surrounding the piston but which is prevented from rupturing when the piston is displaced.

SUMMARY OF THE INVENTION

In accordance with the present invention, an electrically operated valve includes a source of either ac or dc voltage applied serially across an actuator housing, and serially connected copper and stainless steel tubes. The copper tube is coiled around the housing and is in contact with the housing at several points around the housing surface as well as being connected to the housing at one end. Therefore, the copper tube and the housing are in both series and parallel relation with each other. The electrical resistance of this arrangement of copper tube and housing is very low with the consequent joule heating of the copper tube being negligible.

The other end of said copper tube is connected to a stainless steel tube and the opposite end of the stainless steel tube is closed and connected to an electrical terminal. The metal actuator housing has located therein a piston spring-biased to a first position and translatable between that position and a second position in which it closes a valve for working fluid. Actuating liquid is stored in serially connected copper and stainless steel tubes and is capable, when pressurized, of flowing into the actuator housing to shift the piston to its second (i.e. valve closed) position. A seal between the actuating and working fluids takes the form of an elastomeric sleeve which surrounds the piston in the open valve position and which has its two ends secured to the piston and actuator housing, respectively. The housing wall which surrounds the piston acts as a guide wall for the flexible seal when the piston is in other than the open valve position to prevent the seal from bulging excessively at any point along its wall thereby to prevent overstressing of the seal material.

To actuate the piston, the stainless steel tube and the copper tube are connected to a source of electricity (ac or dc). The low resistivity of copper produces minimal heating of the copper tube and the actuating fluid therein; however, the higher resistivity stainless steel tube heats up significantly, causing the fluid therein to flash to vapor and forcing the cooler actuating liquid in the copper tube into the actuator housing where it drives the piston to its closed valve position. The cooler actuating liquid from the copper tube flows into the housing rather than the much hotter vapor from the stainless steel tube, thereby avoiding the undesirable heating of the flexible seal that would occur from contact with the hot vapor or liquid. When the actuating current is removed, the stainless steel tube cools, reducing the vapor pressure therein. In addition, the spring-biased piston begins moving back towards its valve open position, thereby driving relatively cool actuating fluid from the copper tube into the stainless steel tube to augment the cooling process and speed the opening or closing of the valve.

A pressure balancing configuration is employed for the valve plug which is carried by the piston and is arranged to contact a valve seat where it blocks the valve opening to provide closure. This pressure balancing is achieved by using a valve plug of a balanced sleeve construction sealed at two places on the outside diameter of the sleeve with O rings. The upper portion of the sleeve has a larger outside diameter than the loweer portion, therefore, the cross-sectional area of the upper portion is greater than the cross-sectional area of the lower portion. This difference in area is made equal to the cross-sectional area of the actuating piston. By this means, the area of the lower sleeve portion plus the piston area equals the area of the upper sleeve portion and the sleeve-piston assembly is exactly balanced against all combinations of upstream and downstream pressures.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein.

DESCRIPTION OF THE PREFERRED EMBODIMENT

Figure 1:
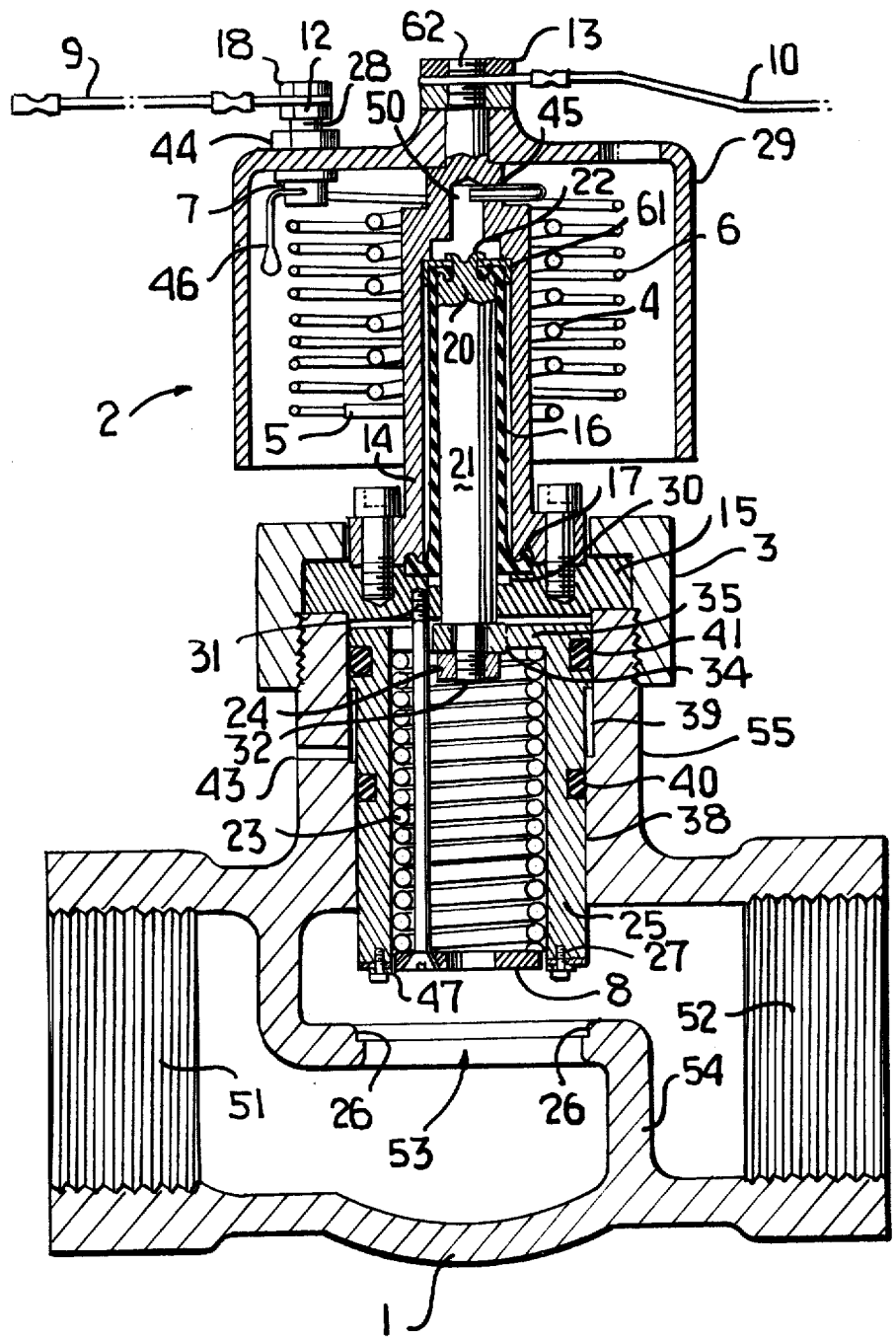
FIG. 1 is a plan view in section of a normally opened embodiment of the present invention.

Referring more specifically to the drawing, a valve according to the present invention includes a valve body 1 having an inlet 51 and an outlet 52 for working fluid. A partition member 54 extends across the flow path between inlet 51 and outlet 52 and has a valve opening 53 defined therein. The downstream side of partition 54 in the region surrounding opening 53 forms a valve seat 26 against which a valve plug 25 can be selectively positioned to prevent working fluid flow through the valve. A hollow cylindrical boss 55 projects outwardly from the valve body in general alignment with opening 53.

An actuator assembly 2, of which valve plug 25 is a part, is secured to valve body 1 by means of threaded union connection 3. Specifically, connection 3 threadedly engages boss 55 at one end while clamping an apertured end plate 15 of actuator assembly 2 against the boss at its other end. Actuator assembly 2 additionally includes an actuator housing 14 in the form of a generally cylindrical inverted cup having an annular shoulder 61 defined in its interior wall proximate its closed end. A threaded stem 62 projects from the closed end of housing 14. An annular cap 19, having an outer diameter substantially equal to the inner diameter of housing 14, is slidably positioned within the housing such that shoulder 61 serves as a stop which limits upward movement of the cap. A piston 21 of generally cylindrical configuration includes a stem 20 which projects through annular cap 19 where it is rivited at 22 and thereby secured to the cap. When the cap 19 abuts shoulder 61, the stem 20 of piston 21 is proximate, but does not block, bore 50 in the closed end of housing 14, leaving a small volume at the upper end of the housing in flow communication with that bore. The lower end of piston 21 projects through apertured end plate 15 and into the hollow boss 55 of the valve body.

An elastomeric seal member 16 is in the form of a sleeve surrounding the upper portion of piston 21. The upper end of seal 16 is secured to piston 21 at mounting and sealing bead 20 between the upper surface of the piston and the lower surface of cap 19. The lower end of seal 16 is secured to housing 14 at mounting and sealing bead 17 between end plate 15 and housing 14. A washer 30, made of teflon or the like, is located in an annular channel defined in end plate 15 and immediately surrounding piston 21 to prevent extrusion of seal 16 through the aperture in the end plate, by pressure, when the piston is moved. Importantly, the inner wall of housing 14, along which cap 19 and piston 21 move when actuated, is disposed relatively close to the piston. More specifically, the volume defined between the piston 21, housing 14, cap 19 and end plate 15 is sufficiently small to limit bulging of any one section of seal 16 as the piston is moved downward from its uppermost position. On the other hand, this volume is large enough to accommodate the radial expansion of the seal 16 as said seal is compressed axially along the piston due to movement of piston along its axis. In other words, as piston 21 moves downwardly, seal 16 is compressed axially which causes the seal to bulge away from the piston at one or more locations until the seal contacts the housing 14. Further radial expansion of the seal is made to occur in other locations along the sleeve resulting in substantially uniform axial compression and radial expansion along the length of seal 16. If unrestrained, this bulging tends to occur at one location only, which location expands and weakens until the seal eventually ruptures. The close proximity of the housing guide wall, however, limits the bulging at any one location, forcing the seal to compress uniformly. External pressure on seal 16 from the fluid-fill presses seal against piston except where there is a tendency to bulge. The seal is therefore compressed without being severely stressed.

The upper end of sleeve plug 25 consists of a hub 34 concentric with the sleeve axis having a hole through which the threaded stem 32 of piston 21 projects. This hub is connected to the sleeve 25 by three radial spokes 35 (only one of which is illustrated) or webs, each connecting the hub 34 with the sleeve 25. Projecting through the spaces between the webs are three threaded bolts 31 (only one of which is illustrated) screwed into the end plate 15. The heads of these bolts support a flat plate 8 which compresses a helical spring 23 against the three radial spokes 35 thereby forcing the sleeve 25 upward against plate 15 to fully open the valve. The sleeve 25 slidably fits into valve bonnet 55 having lower bore diameter 38 and upper bore diameter 39. Bore diameter 39 is larger than bore diameter 38 by an area equal to the cross sectional area of piston 21 seated against hub 34.

The upper and lower outside diameters of sleeve 25 vary in size to slidably fit into the upper and lower portions of the valve bore 39 and 38 respectively. These two outside sleeve diameters contain grooves to contain O-rings 40 and 41 in sealing engagement with the valve bores 38 and 39 respectively. A vent hole 43 is provided in bonnet 55 which is located between said O-rings to prevent buildup of fluid pressure in the annular space between the O-rings due to film leakage.

Line pressure on both ends of sleeve 25 exerts a downward force on the sleeve 25 due to the larger area of sleeve cross-section of the upper portion. Line pressure on the piston 21 cross-section exerts an upward force on the piston. Since the differential sleeve area is made equal to the piston cross-sectional area, the downward sleeve force is cancelled by the upward piston force and the valve is fully balanced against line pressure when either open or closed. Also, being balanced, the valve plug 25 will not open or close due to transient changes in line pressure. This feature considerably lessens the force necessary to close and open the valve, and thereby permits faster valve cycling times to be achieved.

Terminal lead 10 is secured in electrical contact to the stem 62 of electrically grounded housing 14 by means of nuts 13 and 11 which also secure housing 14 or cover 29. Terminal lead 9 is secured and electrically connected by nuts 12 and 18 to one end of stainless steel tube 6. The latter is disposed within cover 29 and is coiled about housing 14 in spaced relation therefrom. One end of stainless steel tube 6 extends through a suitably provided hole in terminal 7 which is threaded to permit engagement by nuts 12 and 18. This threaded portion of 7 projects through an electrical insulator 28 made of a suitable nonconducting material such as plastic which is threaded on the outside to permit engagement by nut 44. By the aforesaid means, terminal 7 is electrically insulated from the cover 29. A copper tube 4 is coiled about housing 14 in immediate contact therewith; and extends directly into housing 14 at 45. One end of copper tube 4 is electrically connected (by silver solder or the like) at 5 to the end of stainless steel tube 6 remote from terminal 7. Copper tube 4 thus serves as a fluid conduit between stainless steel tube 6, sealed at one end at fill tube 46 and the volume above cap 19 in actuator housing 14. Actuating fluid (for example, water) normally fills approximately 90% of the volume in tubes 4 and 6 and above cap 19 when the valve is open (in the position shown). A cylindrical cover 29 surrounds the portion of the assembly above connection member 3.

Copper tube 4 and stainless steel tube 6 are electrically connected in series between terminals 9 and 10 which are connected to a low voltage supply, either ac or dc. Actuation of the valve (to effect closure) requires the passage of current through tubes 4 and 6 in the manner described below.

In operation, assume initially that voltage is removed from the wires 9 and 10 so that the valve is open in the position shown. Under such conditions, working fluid flows through valve body 1 from inlet 51 to outlet 52 through opening 53. In addition, actuating fluid, such as water, fills roughly 90% of the volume of tubes 4 and 6 and the volume above the cap 19 in housing 14. The piston is held in its upper or open position by spring 23 which biases cap 19 against shoulder 61. If now it is desired to close the valve, current is passed through terminal 9, stainless steel tube 6 and copper tube 4. The copper tube is not appreciably heated by the current because of its relatively low resistivity. Stainless steel, on the other hand, has a high resistivity so that tube 6 is heated rather rapidly. The fluid in the heated stainless steel tube flashes to vapor and the resulting pressure increase forces the fluid in copper tube 4 to drive piston 21 downward in opposition to the bias force exerted by spring 23. Plate 47 is thus driven against seat 26 expanding flexible washer 27 and working fluid flow through valve opening 53 is blocked.

The temperature of stainless steel tube 6 continues to rise until the rate of heat loss from the outer surface of that tube equals the input electric power; that is, until a temperature equilibrium is established. This equilibrium temperature is determined by the ature of the stainless steel tube wall and the outer surface area of the stainless steel tube, both of which can be chosen to provide temperature equilibrium at predetermined ambient temperatures; as follows: $q/A = h_c h_r \Delta t$ (at equilibrium or steady state conditions) where $A$ = surface area, $h_c$ = surface coefficient of convection, $h_r$ = surface coefficient of radiation and $q$ = rate of heat loss (mass of tube only applies under transient conditions.) Since the plug and piston crosssections are equalized to provide pressure balance, the actuating pressure exerted by the heated working fluid need only be high enough to overcome the force exerted by spring 23, seal 16 and any frictional forces encountered between the seals 40 and 41 and the walls 38 and 39.

If the system is designed for operation at 70° F. ambient with a temperature equilibrium condition at 350° F., a rise in ambient temperature produces a similar rise in the equilibrium temperature. Thus, an ambient temperature rise to 170° F. would result in an equilibrium temperature of 450°. In addition, if the supply voltage rises, the power dissipation and equilibrium temperature rise accordingly. Since such supply voltage rises are on the order of 10% or less, the equilibrium temperature of the stainless tube will still be below 550° F. for all possible operating conditions. The stainless steel tube can operate below that temperature indefinitely without any deleterious effects so that there is no need for a limit switch or similar temperature interlock.

When de-energized, stainless steel tube 6 cools down, causing a reduction of the actuating fluid vapor pressure. Piston 21, urged by spring 23, displaces actuating fluid from the top of housing 14 and through copper tube 4. The fluid in the copper tube had been cooled during the energized period of the transformer because the copper tube was heated to a much lesser degree than the stainless steel tube by the actuating current, and because housing 14 itself serves as a heat sink for the copper tube which is coiled directly around the housing. The cooler fluid from the copper tube, upon being forced into the stainless steel tube, accelerates the condensation of the vapor and speeds up the opening of the valve.

In addition to speeding up valve opening, the cooling effect provided by copper tube 4 on the actuating fluid results in the cooled fluid, rather than the heated fluid, coming into contact with seal 16. The seal is therefore not stressed to the extent it would be if contacted by hot fluid and its operating life is significantly extended.

The material for seal 16 should be selected from materials which are not attacked by the actuating and working fluids. If water is used for both fluids, Buna-N rubber is an example of a satisfactory seal material.

The length of stroke required for piston 21 depends on particular applications for the valve. In most cases, it is sufficient that plate 47 be spaced from seat 26 by one-fourth the diameter of valve opening 53 when the valve is fully opened; such spacing provides substantially unimpeded working fluid flow.

The low energy required to operate the piston permits the use of a low supply voltage. The resistance of the stainless steel tube requires a low voltage to maintain the proper current. The safety of such low operating voltages is another advantageous feature of the invention. In addition, the low energy requirements permit operating times on the order of a few seconds as compared with operating times on the order of minutes in prior art valves.

The configuration of the inner wall in housing 14 to guide the seal 16 to prevent extended bulging of the seal during piston stroke is a feature which is applicable to more than the valve disclosed herein. For example, this concept of constraining the seal against bulges is applicable to substantially any piston arrangement where a fluid seal is required between one end and the other of the piston.

Figure 2:
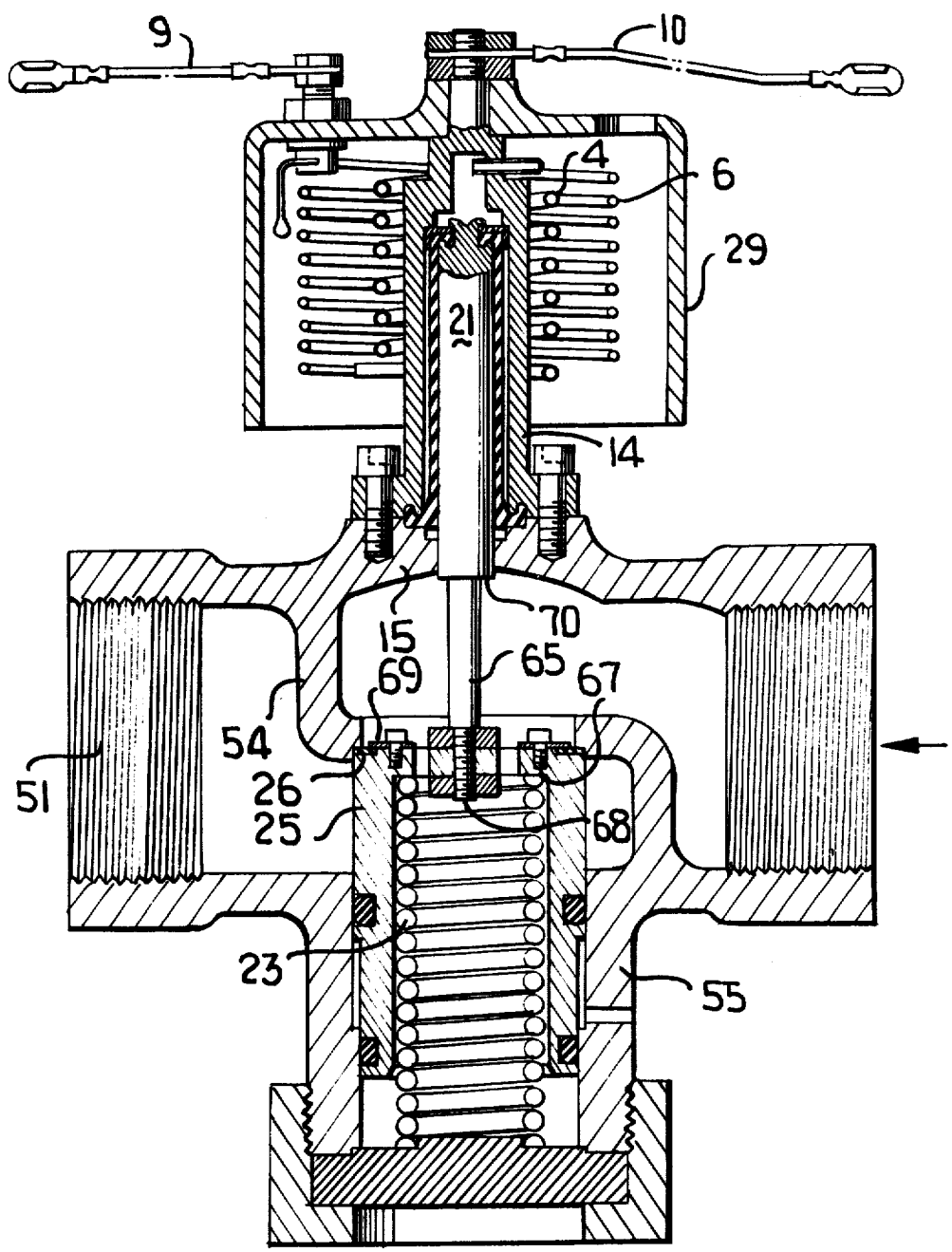
FIG. 2 is a plan view in section of a normally closed embodiment of the present invention.

Although the particular embodiment described herein is a normally open valve which must be current actuated to effect valve closure, it is clear that the principles of the present invention apply equally to normally closed valves which require actuating current to open. Referring to FIG. 2 of the accompanying drawings, a normally closed valve is illustrated. In this configuration, end plate 15 of FIG. 1 is formed as part of the inlet 51 and outlet 52 of the valve body. The sleeve plug 25 is located below the valve seat with the valve seat 26 formed on the underside of the partition 54 wall as viewed in FIG. 2.

The hollow cylindrical boss 55 is also located below the valve seat extending downwardly from the walls of the inlet and outlet of the valve body.

The piston 21 is connected by a long rod 65 to the hub 34 of the spider 35, the rod 65 thus passing through the inlet chamber of the valve.

It is apparent that upon heating of the copper tube, producing downward movement of the piston 21, the sleeve plug 25 is moved downward and the valve is opened.

Complete balancing of the forces on the sleeve plug 25 when the valve is closed is readily achieved by appropriate sizing of the surfaces 66, 67, 68, 69 and 70.

It is also noted that although copper and stainless steel tubes are preferred for the present invention, other metals of low and high resistivity, respectively, may be employed.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. In an electrically actuated heat motor of the type in which a biased piston is translatable in a piston housing in response to an actuating current to change the condition of working fluid in the heat motor, an improvement comprising:
   a first metal tube having relatively low electrical resistance and capable of conducting fluid flow therethrough;
   a second metal tube having relatively high electrical resistance and capable of conducting fluid flow therethrough;
   means connecting said first and second tubes in series across a source of electrical current and in fluid flow communication with one another;
   means connecting said first tube in fluid flow communication with said piston housing to permit pressurized fluid to flow from said first tube to said housing to apply a force to one end of said piston in opposition to said bias;
   a quantity of working fluid disposed in said first and second tubes, said working fluid being of the type which expands to more than fill said tubes upon being heated in said second tube by passage of current from said source through said tubes; and
   sealing means for preventing said working fluid from leaking from said housing.

2. The heat motor according to claim 1 wherein said sealing means is an elastomeric sleeve disposed about a portion of the length of said piston, said sleeve being secured at one end to the piston and at its other end to said housing, and wherein said housing includes a guide wall positioned sufficiently proximate said piston to prevent bulging and the resultant stretching of said sleeve during translation of said piston, said guide wall being positioned sufficiently far from said piston to provide a space which can accommodate the sleeve when it is axially compressed and radially expanded during a piston stroke.

3. The heat motor according to claim 1 wherein said first tube is coiled about said housing in direct contact therewith, and wherein said second tube is coiled about said housing in spaced relation therefrom.

4. The heat motor according to claim 1 or claim 3 wherein said first tube is copper and said second tube is stainless steel.

5. The heat motor according to claim 4 wherein said source of electrical current is low voltage ac or dc, said tubes being connected in series across said voltage source.

6. The heat motor according to claim 4 wherein said working fluid is water.

7. The heat motor according to claim 1 further comprising:
   a valve body including an inlet, an outlet, a valve opening, and a valve seat surrounding said valve opening, said valve opening providing the sole flow path between said inlet and outlet for fluid flowing therethrough; and
   a cylindrical plug secured to the end of said piston remote from said one end, said plug extending into said valve body and being positioned so that one surface thereof abuts said valve seat and closes said valve opening when said piston is fully translated by said working fluid, said plug having unequal cross sectional areas which, together with the cross sectional area of said piston is fully balanced with respect to internal valve pressure.

8. The heat motor according to claim 1 or claim 2 wherein said source of electrical current is a step-down transformer having primary and secondary windings, said tubes being connected in series across said secondary winding.

9. The heat motor according to claim 2 further comprising:
- a valve body including an inlet, an outlet, a valve opening, and a valve seat surrounding said valve opening, said valve opening providing the sole flow path between said inlet and outlet for fluid flowing therethrough; and
- a cylindrical plug secured to the end of said piston remote from said one end, said plug extending into said valve body and being positioned so that one surface thereof abuts said valve seat and closes said valve opening when said piston is fully translated by said working fluid, said plug having unequal cross sectional areas which together with the cross sectional area of said piston is fully balanced with respect to internal valve pressure.

10. The valve according to claim 7 further comprising
- a stop member,
- a spring extending between said piston and said stop member to bias said piston.

11. The heat motor according to claim 1 further comprising:
- a valve body including an inlet, an outlet, a valve opening, and a valve seat surrounding said valve opening, said valve opening providing the sole flow path between said inlet and outlet for fluid flowing therethrough; and
- a cylindrical plug secured to the end of said piston remote from said one end, said plug extending into said valve body and being positioned so that one surface thereof abuts said valve seat and closes said valve opening when said piston is fully translated by said working fluid, said plug having unequal cross sectional areas which, together with the cross sectional area of said piston is fully balanced with respect to internal valve pressure.

12. In a heat motor of the type wherein a piston is translatable in a housing by actuating fluid which is selectively pressurized to apply a translation force against one end of said piston, and wherein said piston means carries a valving surface capable of alternatively blocking and permitting flow of working fluid through a valve opening in accordance with the translational position of said piston, an improved sealing means for preventing mixture of said actuating and working fluids comprising:
- an elastomeric sleeve disposed about a portion of the length of said piston, said sleeve being secured at one end to the piston and at its other end to said housing, and wherein said housing includes a guide wall positioned wholly about and along the entire unsupported length of said sleeve and sufficiently proximate said piston to prevent local bulging and resultant of said sleeve capable of producing fatigue of said sleeve at one location not in excess of fatigue of said sleeve at all other locations resulting from such bulging and flexing during translation of said piston, said guide wall being positioned sufficiently far from said piston to provide a space which can accommodate the sleeve when it is axially compressed and radially expanded during a piston stroke.

13. The heat motor according to claim 12 further comprising an actuator for selectively pressurizing said actuating fluid, said actuator including:
- a first metal tube having relatively low electrical resistance and capable of conducting fluid flow therethrough;
- a second metal tube having relatively high electrical resistance and capable of conducting fluid flow therethrough;
- means connecting said first and second tubes in series between a source of electrical voltage and in fluid flow communication with one another;
- means connection said first tube in fluid flow communication with said piston housing to permit pressurized flow from said first tube to said housing to apply a force to one end of said piston in opposition to said bias; and
- a quantity of actuating fluid disposed in said first and second tubes, said actuating fluid being of the type which expands to more than fill said tubes upon being heated in said second tube by passage of current from said source through said tubes.

14. The heat motor according to claim 13 wherein said first tube is coiled about said housing in direct contact therewith, and wherein said second tube is coiled about said housing in spaced relation therefrom.

15. The heat motor according to claim 14 wherein said first tube is copper and said second tube is stainless steel.

16. The heat motor according to claim 15 wherein said source of electrical current is a step-down transformer having primary and secondary windings, said tubes being connected in series across said secondary winding.

17. The heat motor according to claim 13 further comprising:
- a valve body including an inlet, an outlet, a valve opening, and a valve seat surrounding said valve opening, said valve opening providing the sole flow path between said inlet and outlet for working fluid; and
- a plug secured to the end of said piston remote from said one end, said plug extending into said valve body and being positioned so that one surface thereof abuts said valve seat and closes said valve opening when said piston is fully translated by said actuating fluid, said plug having unequal exposed surface areas between said one surface and the surface opposite said one surface which, together with the cross-sectional area of said piston forms a plug and piston combination that is balanced under internal pressure.

18. The heat motor according to claim 12 further comprising:
- a valve body including an inlet, an outlet, a valve opening, and a valve seat surrounding said valve opening, said valve opening providing the sole flow path between said inlet and outlet for working fluid; and
- a plug secured to the end of said piston remote from said one end, said plug extending into said valve body and being positioned so that one surface thereof abuts said valve seat and closes said valve opening when said piston is fully translated by said actuating fluid, said plug having unequal exposed surface areas between said one surface and the surface opposite said one surface which, together with the cross-sectional area of said piston forms a plug and piston combination that is balanced under internal pressure.

19. In a mechanism of the type wherein a piston is longitudinally movable between first and second extreme positions in a chamber defined in a housing, and wherein a fluid sealing member is provided in the form of an elastomeric sleeve surrounding at least a portion of said piston and secured at opposite ends to said piston and said housing, respectively, said sealing member tending to bulge outwardly from said piston as it moves from said first toward said second position, an improvement comprising a guide wall in said housing positioned wholly about and along the entire unsupported length of said sleeve and positioned proximate said piston to prevent said sleeve from bulging at only one location, the positioning of said guide wall and said piston is capable of producing fatigue of said sleeve at one location not in excess of fatigue of said sleeve at all other locations resulting from such bulging said guide wall surrounding said piston and subsisting at least between the locations of the ends of said sealing member when piston is in said first position, said guide wall defining a volume with said piston which is sufficient to accommodate all of sealing member when it is compressed axially and thereby expanded radially when piston is in said second position.

20. In combination
a piston housing
a piston translatable in said housing means for biasing said piston in a first direction;
a first metal tube having relatively low electrical resistance and capable of conducting fluid flow therethrough;
a second metal tube having relatively high electrical resistance and capable of conducting fluid flow therethrough;
means for connecting said first and second tubes in series across a source of electrical current and in fluid flow communication with one another;
means connecting said first tube in fluid flow communication with said piston housing to permit pressurized flow of fluid from said first tube to said housing to apply a force to one end of said piston in opposition to said bias;
a quantity of actuating fluid disposed in said first and second tubes, said actuating fluid being of the type which expands to more than fill said tubes upon being heated in said second tube by passage of current from said source through said tubes; and
sealing means for preventing said actuating fluid and working fluid from mixing in said housing.

* * * * *